(12) United States Patent
Graupmann et al.

(10) Patent No.: US 12,734,437 B2
(45) Date of Patent: Sep. 15, 2026

(54) SYSTEM AND METHOD FOR SYNCHRONISING LIGHTING EVENT AMONG DEVICES

(71) Applicant: Razer (Asia-Pacific) Pte. Ltd., Singapore (SG)

(72) Inventors: Timothy Alan Graupmann, Singapore (SG); Chee Hiong Chu, Singapore (SG); Shamhaad Fahumee, Singapore (SG); Roy Salanga, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 611 days.

(21) Appl. No.: 18/044,045

(22) PCT Filed: Sep. 23, 2021

(86) PCT No.: PCT/SG2021/050578

§ 371 (c)(1),
(2) Date: Mar. 3, 2023

(87) PCT Pub. No.: WO2022/066102

PCT Pub. Date: Mar. 31, 2022

(65) Prior Publication Data

US 2024/0278114 A1 Aug. 22, 2024

Related U.S. Application Data

(60) Provisional application No. 63/082,267, filed on Sep. 23, 2020.

(51) Int. Cl.
*A63F 13/28* (2014.01)
*A63F 13/22* (2014.01)
(Continued)

(52) U.S. Cl.
CPC .............. *A63F 13/28* (2014.09); *A63F 13/22* (2014.09); *A63F 13/35* (2014.09); *A63F 13/42* (2014.09);
(Continued)

(58) Field of Classification Search
CPC .......... A63F 13/28; A63F 13/22; A63F 13/35; A63F 13/42; G06F 3/0202;
(Continued)

(56) References Cited

U.S. PATENT DOCUMENTS

2007/0189026 A1 8/2007 Chemel et al.
2010/0214419 A1 8/2010 Kaheel et al.
(Continued)

FOREIGN PATENT DOCUMENTS

CN 1283290 A 2/2001
CN 106717125 A 5/2017
(Continued)

OTHER PUBLICATIONS

European search report; dated Feb. 20, 2024; Application # 21873076.0.
(Continued)

*Primary Examiner* — Cory A Almeida
(74) *Attorney, Agent, or Firm* — Polsinelli PC

(57) ABSTRACT

There is a system comprising: a first device configured to display video data, detect a lighting profile for a first plurality of lighting colours produced by the first device, and generate information about the lighting profile; a video synchronisation server configured to transmit the video data being displayed on the first device to a second device; the second device configured to display the video data; and a lighting synchronisation server configured to receive the information from the first device. The video synchronisation server is configured to control the lighting synchronisation
(Continued)

server to transmit the information with a timestamp to the second device, so that the second device is capable of selectively producing a second plurality of lighting colours based on the information and the produced second plurality of lighting colours are matched with the video data being received from the video synchronisation server.

20 Claims, 10 Drawing Sheets

(51) Int. Cl.

| | |
|---|---|
| ***A63F 13/35*** | (2014.01) |
| ***A63F 13/42*** | (2014.01) |
| ***G06F 3/02*** | (2006.01) |
| ***G06F 3/0354*** | (2013.01) |
| ***H04N 21/41*** | (2011.01) |
| ***H04N 21/43*** | (2011.01) |
| ***H04N 21/478*** | (2011.01) |
| ***H04N 21/6547*** | (2011.01) |
| ***H04N 21/8547*** | (2011.01) |

(52) U.S. Cl.
CPC ...... *G06F 3/03543* (2013.01); *G06F 3/03547* (2013.01); *H04N 21/4131* (2013.01); *H04N 21/43076* (2020.08); *H04N 21/43079* (2020.08); *H04N 21/4781* (2013.01); *H04N 21/6547* (2013.01); *H04N 21/8547* (2013.01); *G06F 3/0202* (2013.01)

(58) Field of Classification Search
CPC ............ G06F 3/03543; G06F 3/03547; H04N 21/4131; H04N 21/43076; H04N 21/43079; H04N 21/47811; H04N 21/6547; H04N 21/8547
See application file for complete search history.

(56) References Cited

U.S. PATENT DOCUMENTS

| | | | | |
|---|---|---|---|---|
| 2012/0038782 | A1* | 2/2012 | Messmer | H04N 19/467 348/E7.001 |
| 2013/0217460 | A1 | 8/2013 | Kaminkow et al. | |
| 2014/0232614 | A1* | 8/2014 | Kunkel | H04N 9/67 345/1.1 |
| 2015/0089551 | A1* | 3/2015 | Bruhn | H04N 5/58 725/80 |
| 2016/0078903 | A1 | 3/2016 | Chitnis et al. | |
| 2018/0049287 | A1 | 2/2018 | Lu et al. | |
| 2018/0336929 | A1 | 11/2018 | Filippini et al. | |
| 2020/0029114 | A1 | 1/2020 | Kim et al. | |

FOREIGN PATENT DOCUMENTS

| | | | |
|---|---|---|---|
| CN | 108028968 | A | 5/2018 |
| KR | 20140072812 | A | 6/2014 |

OTHER PUBLICATIONS

International Search Report for PCT/SG2021/050578 issued Dec. 3, 2021 (4 pages).
Chinese first office action; application No. 202180064831.3; dated Jun. 13, 2025.
Taiwanese Office Action issued Oct. 16, 2025 in corresponding Taiwanese Application No. 110135399.
Taiwanese Office Action issued Feb. 10, 2026 in corresponding Taiwanese Application No. 110135399.

* cited by examiner

SYSTEM AND METHOD FOR SYNCHRONISING LIGHTING EVENT AMONG DEVICES

CROSS-REFERENCE TO RELATED APPLICATIONS

This application claims the benefit of U.S. Provisional Patent Application No. 63/082,267 filed on 23 Sep. 2020, the entire contents of which are incorporated herein by reference for all purposes.

TECHNICAL FIELD

Various embodiments relate to a system and a method for synchronising a lighting event among devices.

BACKGROUND

The advent of competitive gaming has made computer gaming into global spectator events. A gamer as a streamer may play the game and fans as viewers may watch a livestreaming game video and/or attend live gaming tournaments as spectators though a video streaming platform such as Facebook Gaming, YouTube, Mixer, and Twitch. The video streaming platform may receive the gaming video from the streamer and transmit the gaming video to the viewers on a real time basis.

In recent years, computing technology has allowed users, for example the streamer, to use one or more computer peripheral devices such as a keyboard, a mouse, a touchpad, etc. each having a plurality of light sources which can produce a lighting event by selectively producing a plurality of lighting colours over time. Such lighting event produced by the computer peripheral devices may enhance the gamer's gaming experiences by making it more realistic, engaging and interactive. However, conventional video streaming platform have not supported sharing of such lighting event produced by the streamer's computer peripheral devices with the viewers.

SUMMARY

According to various embodiments, a system for synchronising a lighting event among devices is provided. The system may comprise: a first device comprising a first display configured to display video data, a first plurality of light sources capable of selectively producing a first plurality of lighting colours, and a lighting engine configured to detect a lighting profile for the produced first plurality of lighting colours and generate information about the lighting profile: a video synchronisation server configured to transmit the video data being displayed on the first display of the first device to a second device, and comprising a user interface configured to be accessed by the first device: the second device comprising a second display configured to display the video data received from the video synchronisation server, and a second plurality of light sources capable of selectively producing a second plurality of lighting colours; and a lighting synchronisation server configured to receive the information about the lighting profile from the lighting engine of the first device. When the first device allows to broadcast the information about the lighting profile via the user interface, the video synchronisation server may further be configured to control the lighting synchronisation server to transmit the information about the lighting profile with a timestamp to the second device, so that the second device is capable of selectively producing the second plurality of lighting colours based on the information about the lighting profile and the produced second plurality of lighting colours are matched with the video data being received from the video synchronisation server.

According to various embodiments, a system for synchronising a lighting event among devices is provided. The system may comprise: a first device comprising a first display configured to display video data, and a first plurality of light sources capable of selectively producing a first plurality of lighting colours; a video synchronisation server configured to transmit the video data being displayed on the first display of the first device to a second device; the second device comprising a second display configured to display the video data received from the video synchronisation server, and a second plurality of light sources capable of selectively producing a second plurality of lighting colours; a cloud server configured to provide the video data to the first device, and generate information about a lighting profile for the video data; and a lighting synchronisation server configured to receive the information about the lighting profile from the cloud server. The video synchronisation server may further be configured to control the lighting synchronisation server to transmit the information about the lighting profile with a timestamp to the first device and the second device, so that the first device is capable of selectively producing the first plurality of lighting colours and the second device is capable of selectively producing the second plurality of lighting colours based on the information about the lighting profile, and the first lighting colours selectively produced by the first device and the second lighting colours selectively produced by the second device are matched with the video data.

According to various embodiments, a method of synchronising a lighting event among devices is provided. The method may comprise: detecting a lighting profile for a first plurality of lighting colours selectively being produced in a first device; generating information about the lighting profile: transmitting the information about the lighting profile from the first device to a lighting synchronisation server; transmitting video data being displayed on the first device to a second device via a video synchronisation server; accessing, by the first device, a user interface provided by the video synchronisation server to allow to broadcast the information about the lighting profile; and controlling the lighting synchronisation server to transmit the information about the lighting profile with a timestamp to the second device, so that the second device is capable of selectively producing a second plurality of lighting colours based on the information about the lighting profile and the produced second plurality of lighting colours are matched with the video data being received from the video synchronisation server.

According to various embodiments, a method of synchronising a lighting event among devices is provided. The method may comprise: providing video data to a first device by a cloud server, so that the first device displays the video data; transmitting the video data being displayed on the first device to a second device via a video synchronisation server; generating information about a lighting profile for the video data by the cloud server; transmitting the information about the lighting profile from the cloud server to a lighting synchronisation server; and controlling the lighting synchronisation server to transmit the information about the lighting profile with a timestamp to the first device and the second device, so that the first device is capable of selectively producing a first plurality of lighting colours and the second device is capable of selectively producing a second plurality of lighting colours based on the information about the lighting profile, and the first plurality of lighting colours selectively produced by the first device and the second plurality of lighting colours selectively produced by the second device are matched with the video data.

Additional features for advantageous embodiments are provided in the dependent claims.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
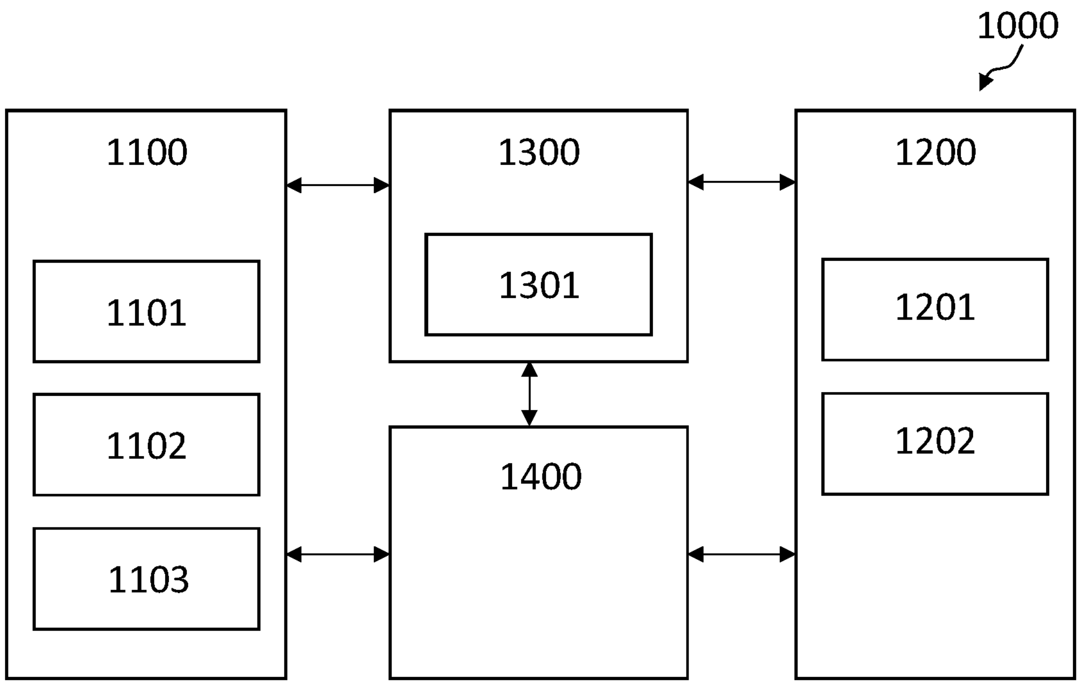
FIGS. 1 and 2 show block diagrams of a system according to various embodiments.

Embodiments described below in context of the system are analogously valid for the method, and vice versa. Furthermore, it will be understood that the embodiments described below may be combined, for example, a part of one embodiment may be combined with a part of another embodiment.

It will be understood that any property described herein for a specific device may also hold for any device described herein. Furthermore, it will be understood that for any device described herein, not necessarily all the components described must be enclosed in the device, but only some (but not all) components may be enclosed.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, structure or any part of any device or structure. In addition, the singular terms "a", "an", and "the" include plural references unless context clearly indicates otherwise. Similarly, the word "or" is intended to include "and" unless the context clearly indicates otherwise.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Throughout the description, a first device may be a device or a device set including a plurality of devices belonging to a streamer (hereinafter, referred to as a "first user") who streams video data to one or more viewers (hereinafter, referred to as a "second user"). In some embodiments, the first device may include one or more first sub-devices (as will be described in further detail below with FIG. 2). A second device may be a device or a device set including a plurality of devices belonging to the second user who watches the video data that the first user streams. In some embodiments, the second device may include one or more second sub-devices (as will be described in further detail below with FIG. 2).

Throughout the description, each of the first device and the second device may include a computer peripheral device. For example, each of the first device and the second device may include, but not be limited to, a monitor, a keyboard, a mouse, a touchpad, a keypad, a trackball, a pointing stick, a joystick, a light pen, a mousepad, a wrist rest, a speaker, a headset, a ChromaLink, and any combination thereof.

In order that the invention may be readily understood and put into practical effect, various embodiments will now be described by way of examples and not limitations, and with reference to the figures.

In accordance with various embodiments, a system and a method for synchronising a lighting event among devices is provided.

FIG. 1 shows a block diagram of a system 1000 according to various embodiments.

As shown in FIG. 1, the system 1000 may include a first device 1100, a second device 1200, a video synchronisation server 1300 and a lighting synchronisation server 1400.

In some embodiments, the first device 1100 may include a display 1101 (hereinafter, referred to as a "first display 1101") configured to display video data. For example, the first display 1101 may display the video data relating to a game in which the first user is currently playing. In some embodiments, the first display 1101 may include a single display. In some other embodiments, the first display 1101 may include a plurality of displays which may display the same or different screen.

In some embodiments, the first device 1100 may further include a plurality of light sources 1102 (hereinafter, referred to as a "first plurality of light sources 1102") capable of selectively producing a plurality of lighting colours (hereinafter, referred to as a "first plurality of lighting colours"). The first plurality of light sources 1102 may be housed in the first device 1100. The first plurality of light sources 1102 may be capable of emitting light. In some embodiments, each light source of the first plurality of light sources 1102 may be capable of selectively producing the first plurality of lighting colours. Each light source of the first plurality of light sources 1102 may be configured to produce the light in various lighting colours, for example, including red, green, blue, or any combinations thereof. For example, each light source of the first plurality of light sources 1102 may include an RGB LED (red-green-blue light emitting diode). In some embodiments, the light produced by each light source of the first plurality of light sources 1102 may be matched with the video data. Accordingly, the first device 1100 may provide the first user with refined and enhanced user experiences by producing a variety of lighting colours over time matched with the video data being displayed on the first display 1101.

In some embodiments, the first device 1100 may further include a lighting engine 1103 configured to detect a lighting profile for the produced first plurality of lighting colours and generate information about the lighting profile. In some embodiments, the first device 1100 may include an instance of a software development kit (SDK) for the lighting event. In some embodiments, the SDK may include the lighting engine 1103. For example, additional hardware component for detecting the lighting profile may not be required. In some other embodiments, the lighting engine 1103 may be a processor or a part of the processor. In some embodiments, the lighting engine 1103 may control and coordinate the first device 1100, for example, the one or more first sub-devices, for the lighting event. In some embodiments, the lighting engine 1103 may detect the lighting profile for the first plurality of lighting colours produced by the first plurality of light sources 1102. The lighting engine 1103 may generate the information about the lighting profile to transmit to the lighting synchronised server 1400.

In some embodiments, the lighting engine 1103 may be configured to control each of the first plurality of light sources 1102 to produce at least one predetermined lighting colour among the first plurality of lighting colours. In some embodiments, the first device 1100 may further comprise an input device (not shown) configured to trigger switching between a plurality of lighting profiles, and the lighting engine 1103 may be configured to control each of the first plurality of light sources 1102 to produce at least one predetermined lighting colour respectively based on one of the plurality of lighting profiles selected by switching. For example, the lighting event may be triggered by the first user's selection, for example, pressing a key of the input device. The selected lighting profile may be layered on top of other lighting profiles according to the first user's priority listing. In some other embodiments, the lighting engine 1103 may have an integration with a game server (not shown) where in-game event may produce a specific lighting profile.

In some embodiments, the second device 1200 may include a display 1201 (hereinafter, referred to as a "second display 1201") configured to display the video data. For example, the second display 1201 may display the video data received from the video synchronisation server 1300. In some embodiments, the second device 1200 may include a single display. In some other embodiments, the second device 1200 may include a plurality of displays which may display the same or different screen.

In some embodiments, the second device 1200 may further include a plurality of light sources 1202 (hereinafter, referred to as a "second plurality of light sources 1202") capable of selectively producing a plurality of lighting colours (hereinafter, referred to as a "second plurality of lighting colours"). In some embodiments, the first plurality of lighting colours and the second plurality of lighting colours are the same. The second plurality of light sources 1202 may be housed in the second device 1200. The second plurality of light sources 1202 may be capable of emitting light. In some embodiments, each light source of the second plurality of light sources 1202 may be capable of selectively producing the second plurality of lighting colours. Each light source of the second plurality of light sources 1202 may be configured to produce the light in various lighting colours, for example, including red, green, blue, or any combinations thereof. For example, each light source of the second plurality of light sources 1202 may include an RGB LED (red-green-blue light emitting diode).

In some embodiments, although not shown, the second device 1200 may further include a lighting engine configured to control each of the second plurality of light sources 1202 to produce at least one predetermined lighting colour among the second plurality of lighting colours. In some embodiments, the second device 1200 may include an instance of a software development kit (SDK) for the lighting event. In some embodiments, the SDK may include the lighting engine. In some other embodiments, the lighting engine may be a processor or a part of the processor.

In some embodiments, the video synchronisation server 1300 may be configured to transmit the video data being displayed on the first display 1101 of the first device 1100 to the second device 1200. The video synchronisation server 1300 may be capable of communicating with at least one of the first device 1100, the second device 1200 and the light synchronisation server 1400. The video synchronisation server 1300 may include a streaming platform. In some embodiments, the video synchronisation server 1300 may comprise a user interface 1301. The first device 1100 may access the user interface 1301 to control streaming of the video data and/or the information about the lighting profile. For example, the first device 1100 may selectively enable or disable the broadcasting of the information about the lighting profile via the user interface 1301. As an example, the first display 1101 may display a screen relating to the user interface 1301, and the first user may select an icon and/or a button (for example, an "authorisation button") to selectively enable or disable the broadcasting of the information about the lighting profile. For example, after the first user selects the authorisation button, the user interface 1301 may show a notification that the information about the lighting profile is being received.

In some embodiments, when the broadcasting of the information about the lighting profile is disabled by the first device 1100, the video synchronisation server 1300 may be configured to control the lighting synchronisation server 1400 to stop transmitting the information about the lighting profile to the second device 1200.

In some embodiments, the light synchronisation server 1400 may be configured to receive the information about the lighting profile from the lighting engine 1103 of the first device 1100. The light synchronisation server 1400 may be capable of communicating with at least one of the first device 1100, the second device 1200 and the video synchronisation server 1300. When the first device 1100 allows to broadcast the information about the lighting profile via the user interface 1301, the video synchronisation server 1300 may further be configured to control the lighting synchronisation server 1400 to transmit the information about the lighting profile with a timestamp to the second device 1200. The lighting synchronisation server 1400 may receive the first user's instructions via the video synchronisation server 1300.

In some embodiments, when the first user allows to broadcast the information about the lighting profile via the user interface 1301, the lighting synchronisation server 1400 may transmit the information about the lighting profile with the timestamp to the second device 1200. The second device 1200 may receive the video data from the video synchronization server 1300 and the information about the lighting profile with the timestamp from the lighting synchronization server 1400. The second device 1200 may be capable of displaying the received video data on the second display 1201, and selectively producing the second plurality of lighting colours based on the information about the lighting profile. The timestamp may be used to synchronise the lighting event produced by the second device 1200 with the video data displayed on the second device 1200. In some embodiments, the second plurality of lighting colours produced by the second plurality of light sources 1202 may be matched with the video data being received from the video synchronisation server 1300. In some embodiments, the second plurality of lighting colours produced by the second plurality of light sources 1202 may be matched with the first plurality of lighting colours produced by the first plurality of light sources 1102. For example, the first plurality of light sources 1102 and the second plurality of light sources 1202 may produce the same lighting colour at the same time. As an example, a first part of the first plurality of light sources 1102 and a first part of the second plurality of light sources 1202 may produce the same certain lighting colour at the same time, and a second part of the first plurality of light sources 1102 and a second part of the second plurality of light sources 1202 may produce the same lighting colour (but different from the certain lighting colour) at the same time. Accordingly, the first user may share not only the video data but also the lighting event with the second user. The second device 1200 may provide the second user with refined and enhanced user experiences by producing a variety of lighting colours over time matched with the video data being displayed on the first display 1101 of the first device 1100 and the second display 1201 of the second device 1200.

Figure 2:
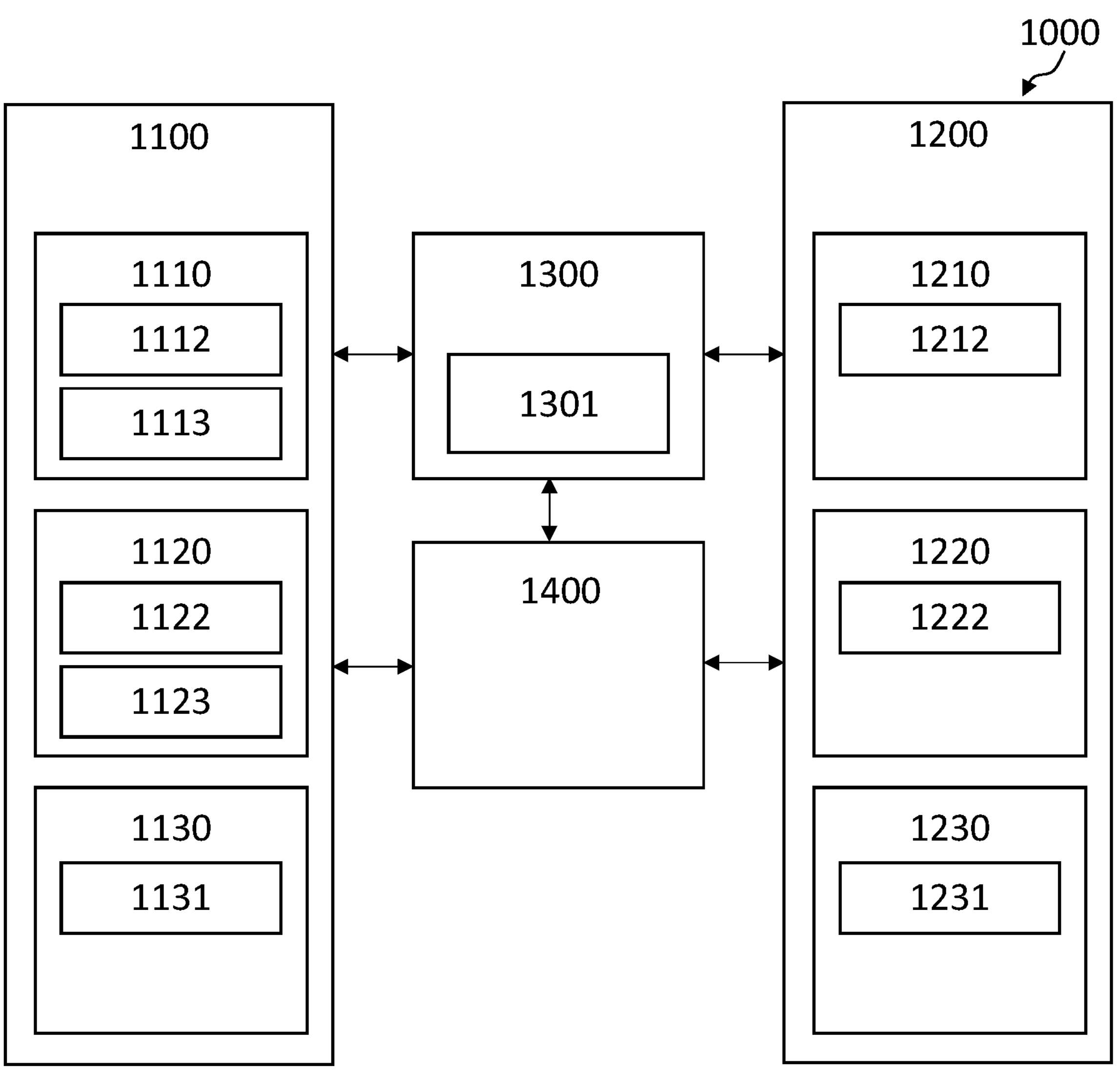

FIG. 2 shows a block diagram of the system 1000 according to various embodiments.

As shown in FIG. 2, the system 1000 may include the first device 1100, the second device 1200, the video synchronisation server 1300 and the lighting synchronisation server 1400 (as described in further detail above with FIG. 1).

In some embodiments, the first device 1100 may comprise a display device 1130 (hereinafter, referred to as a "first display device 1130") including the first display 1131. The first device 1100 may further comprise one or more first sub-devices. Hereinafter, for ease of explanation, the one or more first sub-devices will be referred to as a plurality of first sub-devices 1110, 1120. Even though FIG. 2 shows two (2) first sub-devices 1110, 1120, it may be appreciated that the number of the first sub-devices is not limited to two (2). In some embodiments, each of the plurality of first sub-devices 1110, 1120 may communicate with one another. In some embodiments, each of the plurality of first sub-devices 1110, 1120 may comprise at least one light source 1112, 1122 of the first plurality of light sources 1102. In some embodiments, each of the plurality of first sub-devices 1110, 1120 may comprise the lighting engine 1113, 1123 respectively.

In some embodiments, each of the plurality of first sub-devices 1110, 1120 may include the instance of the software development kit (SDK) for the lighting event. In some embodiments, each SDK may include the lighting engine 1113, 1123 respectively. In some embodiments, each lighting engine 1113, 1123 may detect the lighting profile for the first plurality of lighting colours produced by each of the plurality of first sub-devices 1110, 1120, generate the information about the lighting profile, and transmit the information about the lighting profile to the lighting synchronisation server 1400. In some other embodiments, one of the lighting engines 1113, 1123 may detect the lighting profile for the first plurality of lighting colours produced by each of the plurality of first sub-devices 1110, 1120, generate the information about the lighting profile, and transmit the information about the lighting profile to the lighting synchronisation server 1400.

In some embodiments, each lighting engine 1113, 1123 may be configured to control each of the plurality of first sub-devices 1110, 1120 to produce at least one predetermined lighting colour among the first plurality of lighting colours.

In some embodiments, the first device 1100, for example, the first display device 1130 and/or the plurality of first sub-devices 1110, 1120, may further comprise an input device (not shown) configured to trigger switching between a plurality of lighting profiles, and each lighting engine 1113, 1123 may be configured to control each of the plurality of first sub-devices 1110, 1120 to produce at least one predetermined lighting colour respectively based on one of the plurality of lighting profiles selected by switching.

In some embodiments, the second device 1200 may comprise a display device 1230 (hereinafter, referred to as a "second display device 1230") including the second display 1231. The second device 1200 may further comprise one or more second sub-devices. Hereinafter, for ease of explanation, the one or more second sub-devices will be referred to as a plurality of second sub-devices 1210, 1220. Even though FIG. 2 shows two (2) second sub-devices 1210, 1220, it may be appreciated that the number of the second sub-devices is not limited to two (2). In some embodiments, each of the plurality of second sub-devices 1210, 1220 may communicate with one another. In some embodiments, each of the plurality of second sub-devices 1210, 1220 may comprise at least one light source 1212, 1222 of the second plurality of light sources 1202.

Although not shown, in some embodiments, each of the plurality of second sub-devices 1210, 1220 may comprise the lighting engine configured to control each of the second plurality of light sources 1212, 1222 to produce at least one predetermined lighting colour among the second plurality of lighting colours.

In some embodiments, the video synchronisation server 1300 may transmit the video data being displayed on the first display 1131 of the first display device 1130 to the second device 1200. The video synchronisation server 1300 may comprise the user interface 1301. The first device 1100, for example, the first display device 1130 and/or at least one of the plurality of first sub-devices 1110, 1120, may access the user interface 1301 to control streaming of the video data and/or the information about the lighting profile. For example, the first display 1131 of the first display device 1130 may display the screen relating to the user interface 1301, and the first user may select an icon and/or a button (for example, an "authorisation button") to selectively enable or disable the broadcasting of the information about the lighting profile.

In some embodiments, the lighting synchronisation server 1400 may receive the information about the lighting profile from each lighting engine 1113, 1123. In some other embodiments, the lighting synchronisation server 1400 may receive the information about the lighting profile from the one of the lighting engines 1113, 1123.

In some embodiments, when the first device 1100, for example, the first display device 1130 and/or at least one of the plurality of first sub-devices 1110, 1120, allows to broadcast the information about the lighting profile via the user interface 1301, the video synchronisation server 1300 may further be configured to control the lighting synchronisation server 1400 to transmit the information about the lighting profile with the timestamp to the second device 1200, for example, the second display device 1230 and/or at least one of the plurality of second sub-devices 1210, 1220. Each of the plurality of second sub-devices 1210, 1220 may be capable of selectively producing the second plurality of lighting colours based on the information about the lighting profile. The produced second plurality of lighting colours may be matched with the video data being received from the video synchronisation server 1300.

Figure 3:
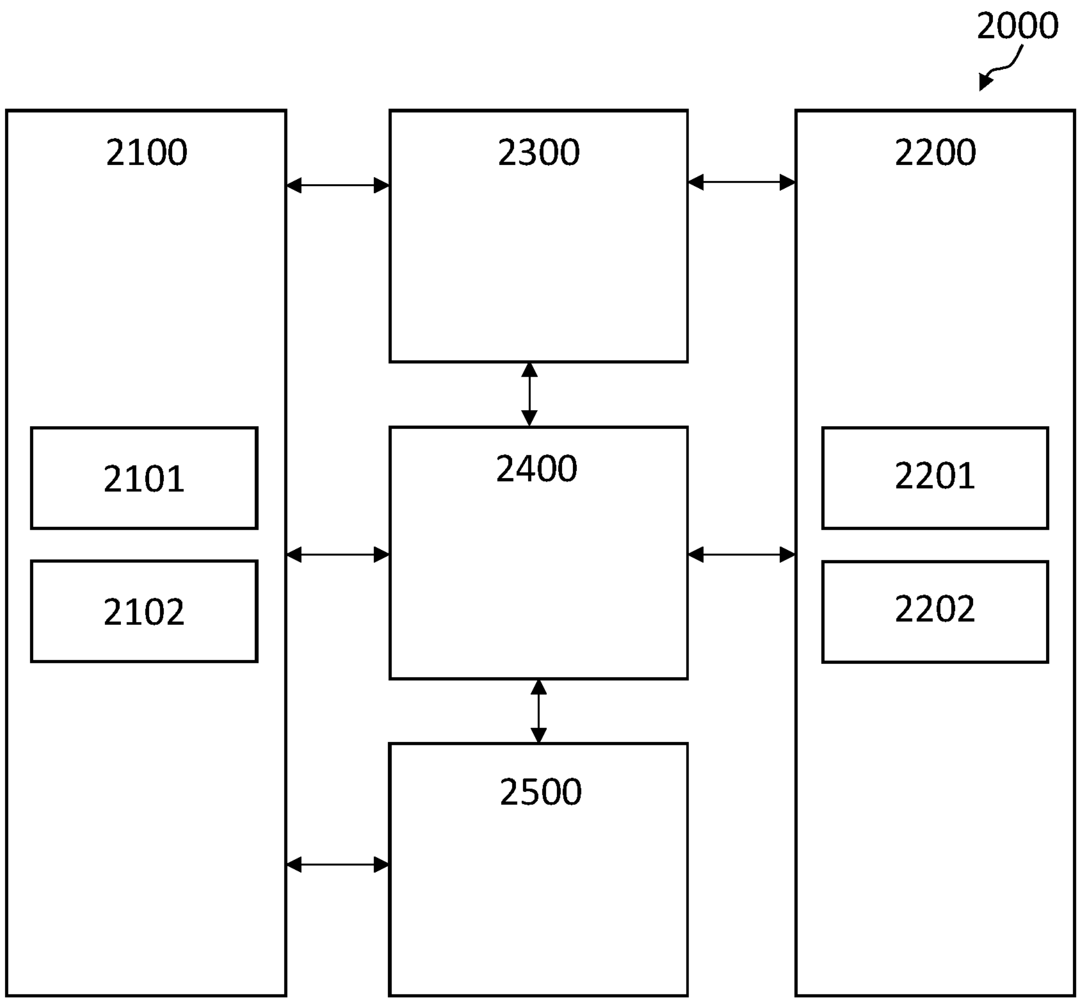
FIGS. 3 and 4 show block diagrams of another system according to various embodiments.

FIG. 3 shows a block diagram of another system 2000 according to various embodiments.

As shown in FIG. 3, the system 2000 may include a first device 2100, a second device 2200, a video synchronisation server 2300 and a lighting synchronisation server 2400 and a cloud server 2500.

In some embodiments, the cloud server 2500 may be configured to provide the video data to the first device 2100. The cloud server 2500 may generate information about a lighting profile for the video data. The cloud server 2500 may transmit the information about the lighting profile to the lighting synchronisation server 2400. The cloud server 2500 may be capable of communicating with at least one of the first device 2100 and the lighting synchronisation server 2400. For example, the cloud server 2500 may include a game cloud server to provide game video data and the information about the lighting profile for the game video data.

In some embodiments, the first device 2100 may include a display 2101 (hereinafter, referred to as a "first display 2101") configured to display video data. For example, the first display 2101 may display the video data relating to a game received from the cloud server 2500. In some embodiments, the first display 2101 may include a single display. In some other embodiments, the first display 2101 may include a plurality of displays which may display the same or different screen.

In some embodiments, the first device 2100 may further include a plurality of light sources 2102 (hereinafter, referred to as a "first plurality of light sources 2102") capable of selectively producing a plurality of lighting colours (hereinafter, referred to as a "first plurality of lighting colours"). The first plurality of light sources 2102 may be housed in the first device 2100. The first plurality of light sources 2102 may be capable of emitting light. In some embodiments, each light source of the first plurality of light sources 2102 may be capable of selectively producing the first plurality of lighting colours. Each light source of the first plurality of light sources 2102 may be configured to produce the light in various lighting colours, for example, including red, green, blue, or any combinations thereof. For example, each light source of the first plurality of light sources 2102 may include an RGB LED (red-green-blue light emitting diode). In some embodiments, the light produced by each light source of the first plurality of light sources 2102 may be matched with the video data received from the cloud server 2500. Accordingly, the first device 2100 may provide the first user with refined and enhanced user experiences by producing a variety of lighting colours over time matched with the video data being displayed on the first display 2101.

In some embodiments, although not shown, the first device 2100 may further include a lighting engine configured to control each of the first plurality of light sources 2102 to produce at least one predetermined lighting colour among the first plurality of lighting colours. In some embodiments, the first device 2100 may include an instance of a software development kit (SDK) for the lighting event. In some embodiments, the SDK may include the lighting engine. In some other embodiments, the lighting engine may be a processor or a part of the processor.

In some embodiments, the second device 2200 may include a display 2201 (hereinafter, referred to as a "second display 2201") configured to display the video data. For example, the second display 2201 may display the video data relating to the game received from the video synchronisation server 2300. In some embodiments, the second device 2200 may include a single display. In some other embodiments, the second device 2200 may include a plurality of displays which may display the same or different screen.

In some embodiments, the second device 2200 may further include a plurality of light sources 2202 (hereinafter, referred to as a "second plurality of light sources 2202") capable of selectively producing a plurality of lighting colours (hereinafter, referred to as a "second plurality of lighting colours"). In some embodiments, the first plurality of lighting colours and the second plurality of lighting colours are the same. The second plurality of light sources 2202 may be housed in the second device 2200. The second plurality of light sources 2202 may be capable of emitting light. In some embodiments, each light source of the second plurality of light sources 2202 may be capable of selectively producing the second plurality of lighting colours. Each light source of the second plurality of light sources 2202 may be configured to produce the light in various lighting colours, for example, including red, green, blue, or any combinations thereof. For example, each light source of the second plurality of light sources 2202 may include an RGB LED (red-green-blue light emitting diode).

In some embodiments, although not shown, the second device 2200 may further include a lighting engine configured to control each of the second plurality of light sources 2202 to produce at least one predetermined lighting colour among the second plurality of lighting colours. In some embodiments, the second device 2200 may include an instance of a software development kit (SDK) for the lighting event. In some embodiments, the SDK may include the lighting engine. In some other embodiments, the lighting engine may be a processor or a part of the processor.

In some embodiments, the video synchronisation server 2300 may be configured to transmit the video data being displayed on the first display 2101 of the first device 2100 to the second device 2200. The video synchronisation server 2300 may be capable of communicating with at least one of the first device 2100, the second device 2200 and the light synchronisation server 2400. The video synchronisation server 2300 may include a streaming platform.

In some embodiments, the light synchronisation server 2400 may be configured to receive the information about the lighting profile from the cloud server 2500. The light synchronisation server 2400 may be capable of communicating with at least one of the first device 2100, the second device 2200, the video synchronisation server 2300 and the cloud server 2500.

In some embodiments, the video synchronisation server 2300 may further be configured to control the lighting synchronisation server 2400 to transmit the information about the lighting profile with a timestamp to the first device 2100 and the second device 2200. The first device 2100 may be capable of selectively producing the first plurality of lighting colours and the second device 2200 may be capable of selectively producing the second plurality of lighting colours based on the information about the lighting profile. The first lighting colours selectively produced by the first device 2100 and the second lighting colours selectively produced by the second device 2200 may be matched with the video data. For example, the first plurality of light sources 2102 and the second plurality of light sources 2202 may produce the same lighting colour at the same time. As an example, a first part of the first plurality of light sources 2102 and a first part of the second plurality of light sources 2202 may produce the same certain lighting colour at the same time, and a second part of the first plurality of light sources 2102 and a second part of the second plurality of light sources 2202 may produce the same lighting colour (but different from the certain lighting colour) at the same time.

In some embodiments, the first device 2100 may create another lighting profile. In some other embodiments, the first device 2100 may detect the lighting profile produced by the first plurality of light sources 2102. Although not shown, the first device 2100 may further comprise a supplementary lighting engine configured to transmit information about the lighting profile created by the first device or detected from the first device 2100 to the second device 2200 via the lighting synchronisation server 2400.

Figure 4:
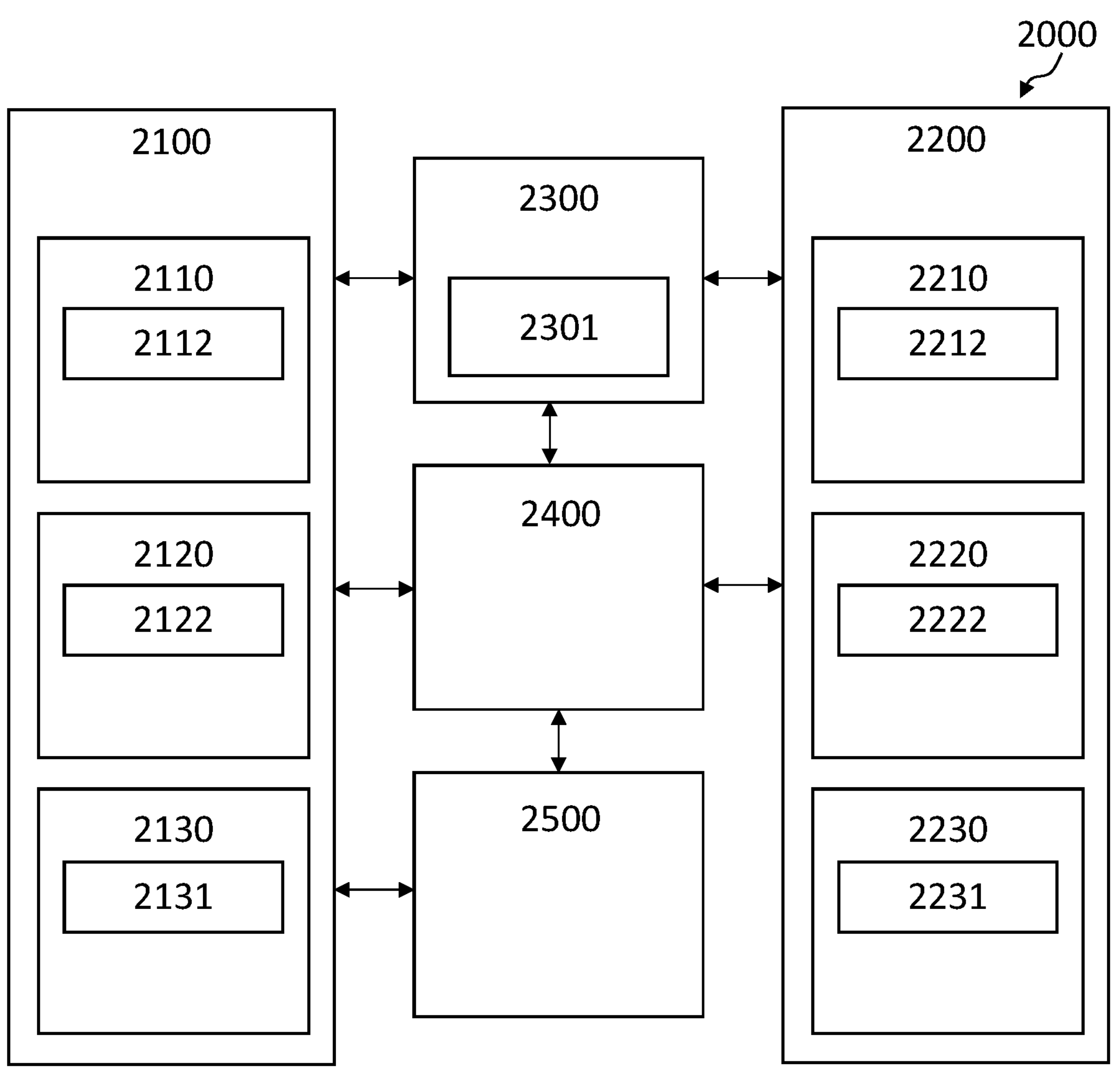

FIG. 4 shows a block diagram of the system 2000 according to various embodiments.

As shown in FIG. 4, the system 2000 may include the first device 2100, the second device 2200, the video synchronisation server 2300, the lighting synchronisation server 2400, and the cloud server 2500 (as described in further detail above with FIG. 3).

In some embodiments, the first device 2100 may comprise a display device 2130 (hereinafter, referred to as a "first display device 2130") including the first display 2131. The first device 2100 may further comprise one or more first sub-devices. Hereinafter, for ease of explanation, the one or more first sub-devices will be referred to as a plurality of first sub-devices 2110, 2120. Even though FIG. 4 shows two (2) first sub-devices 2110, 2120, it may be appreciated that the number of the first sub-devices is not limited to two (2). In some embodiments, each of the plurality of first sub-devices 2110, 2120 may communicate with one another. In some embodiments, each of the plurality of first sub-devices 2110, 2120 may comprise at least one light source 2112, 2122 of the first plurality of light sources 2102.

In some embodiments, although not shown, each of the plurality of first sub-devices 2110, 2120 may comprise the lighting engine respectively.

In some embodiments, each of the plurality of first sub-devices 2110, 2120 may include the instance of the software development kit (SDK) for the lighting event. In some embodiments, each SDK may include the lighting engine respectively. In some embodiments, each lighting engine may be configured to control each of the plurality of first sub-devices 2110, 2120 to produce at least one predetermined lighting colour among the first plurality of lighting colours.

In some embodiments, the second device 2200 may comprise a display device 2230 (hereinafter, referred to as a "second display device 2230") including the second display 2231. The second device 2200 may further comprise one or more second sub-devices. Hereinafter, for ease of explanation, the one or more second sub-devices will be referred to as a plurality of second sub-devices 2210, 2220. Even though FIG. 2 shows two (2) second sub-devices 2210, 2220, it may be appreciated that the number of the second sub-devices is not limited to two (2). In some embodiments, each of the plurality of second sub-devices 2210, 2220 may communicate with one another. In some embodiments, each of the plurality of second sub-devices 2210, 2220 may comprise at least one light source 2212, 2222 of the second plurality of light sources 2202.

Although not shown, in some embodiments, each of the plurality of second sub-devices 2210, 2220 may comprise the lighting engine configured to control each of the second plurality of light sources 2202 to produce at least one predetermined lighting colour among the second plurality of lighting colours.

In some embodiments, the video synchronisation server 2300 may transmit the video data being displayed on the first display 2131 of the first display device 2130 to the second device 2200.

In some embodiments, the lighting synchronisation server 2400 may receive the information about the lighting profile from the cloud server 2500.

In some embodiments, the video synchronisation server 2300 may further be configured to control the lighting synchronisation server 2400 to transmit the information about the lighting profile with the timestamp to the first device 2100, for example, the first display device 2130 and/or at least one of the plurality of first sub-devices 2110, 2120, and the second device 2200, for example, the second display device 2230 and/or at least one of the plurality of second sub-devices 2210, 2220. The plurality of first sub-devices 2110, 2120 may be capable of selectively producing the first plurality of lighting colours, and the plurality of second sub-devices 2210, 2220 may be capable of selectively producing the second plurality of lighting colours, based on the information about the lighting profile. The first lighting colours selectively produced by the plurality of first sub-devices 2110, 2120 and the second lighting colours selectively produced by the plurality of second sub-devices 2210, 2220 may be matched with the video data.

Figure 5:
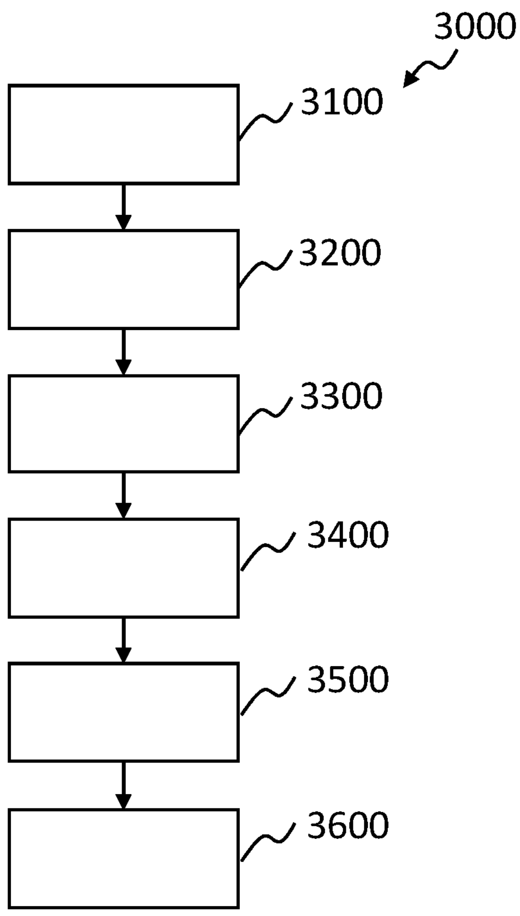
FIG. 5 shows a flowchart of a method according to various embodiments.

FIG. 5 shows a flowchart of a method 3000 according to various embodiments. According to various embodiments, the method 3000 of synchronising a lighting event among devices is provided.

In some embodiments, the method 3000 may include a step 3100 of detecting a lighting profile for a first plurality of lighting colours selectively being produced in a first device.

In some embodiments, the method 3000 may include a step 3200 of generating information about the lighting profile.

In some embodiments, the method 3000 may include a step 3300 of transmitting the information about the lighting profile from the first device to a lighting synchronisation server.

In some embodiments, the method 3000 may include a step 3400 of transmitting video data being displayed on the first device to a second device via a video synchronisation server.

In some embodiments, the method 3000 may include a step 3500 of accessing, by the first device, a user interface provided by the video synchronisation server to allow to broadcast the information about the lighting profile.

In some embodiments, the method 3000 may include a step 3600 of controlling the lighting synchronisation server to transmit the information about the lighting profile with a timestamp to the second device, so that the second device is capable of selectively producing a second plurality of lighting colours based on the information about the lighting profile and the produced second plurality of lighting colours are matched with the video data being received from the video synchronisation server.

Figure 6:
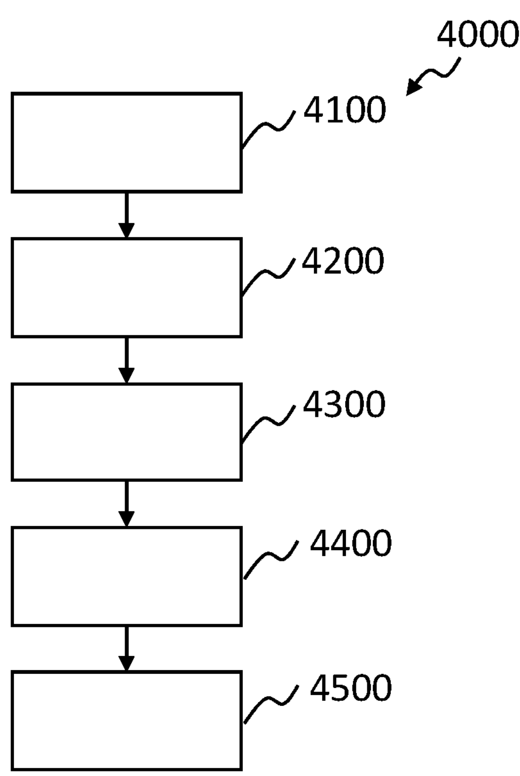
FIG. 6 shows a flowchart of another method according to various embodiments.

FIG. 6 shows a flowchart of a method 4000 according to various embodiments.

According to various embodiments, the method 4000 of synchronising a lighting event among devices is provided.

In some embodiments, the method 4000 may include a step 4100 of providing video data to a first device by a cloud server, so that the first device displays the video data.

In some embodiments, the method 4000 may include a step 4200 of transmitting the video data being displayed on the first device to a second device via a video synchronisation server.

In some embodiments, the method 4000 may include a step 4300 of generating information about a lighting profile for the video data by the cloud server.

In some embodiments, the method 4000 may include a step 4400 of transmitting the information about the lighting profile from the cloud server to a lighting synchronisation server.

In some embodiments, the method 4000 may include a step 4500 of controlling the lighting synchronisation server to transmit the information about the lighting profile with a timestamp to the first device and the second device, so that the first device is capable of selectively producing a first plurality of lighting colours and the second device is capable of selectively producing a second plurality of lighting colours based on the information about the lighting profile, and the first plurality of lighting colours selectively produced by the first device and the second plurality of lighting colours selectively produced by the second device are matched with the video data.

Figure 7:
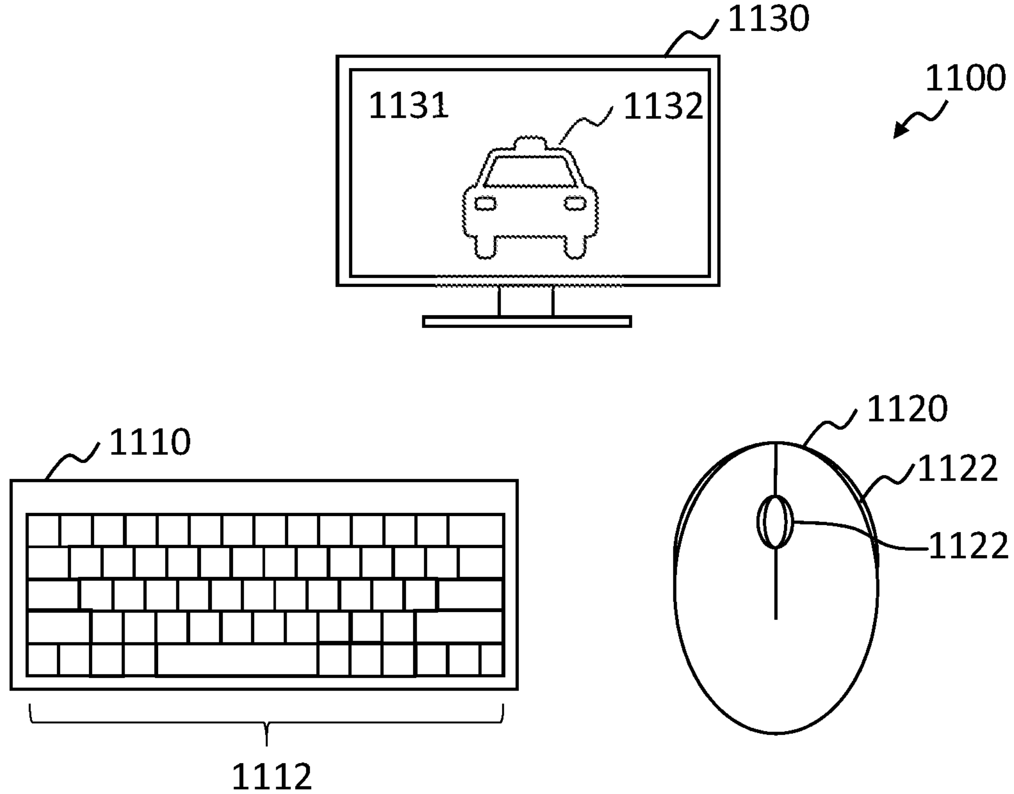
FIGS. 7 and 8 show exemplary diagrams of the system according to various embodiments.
Figure 8:
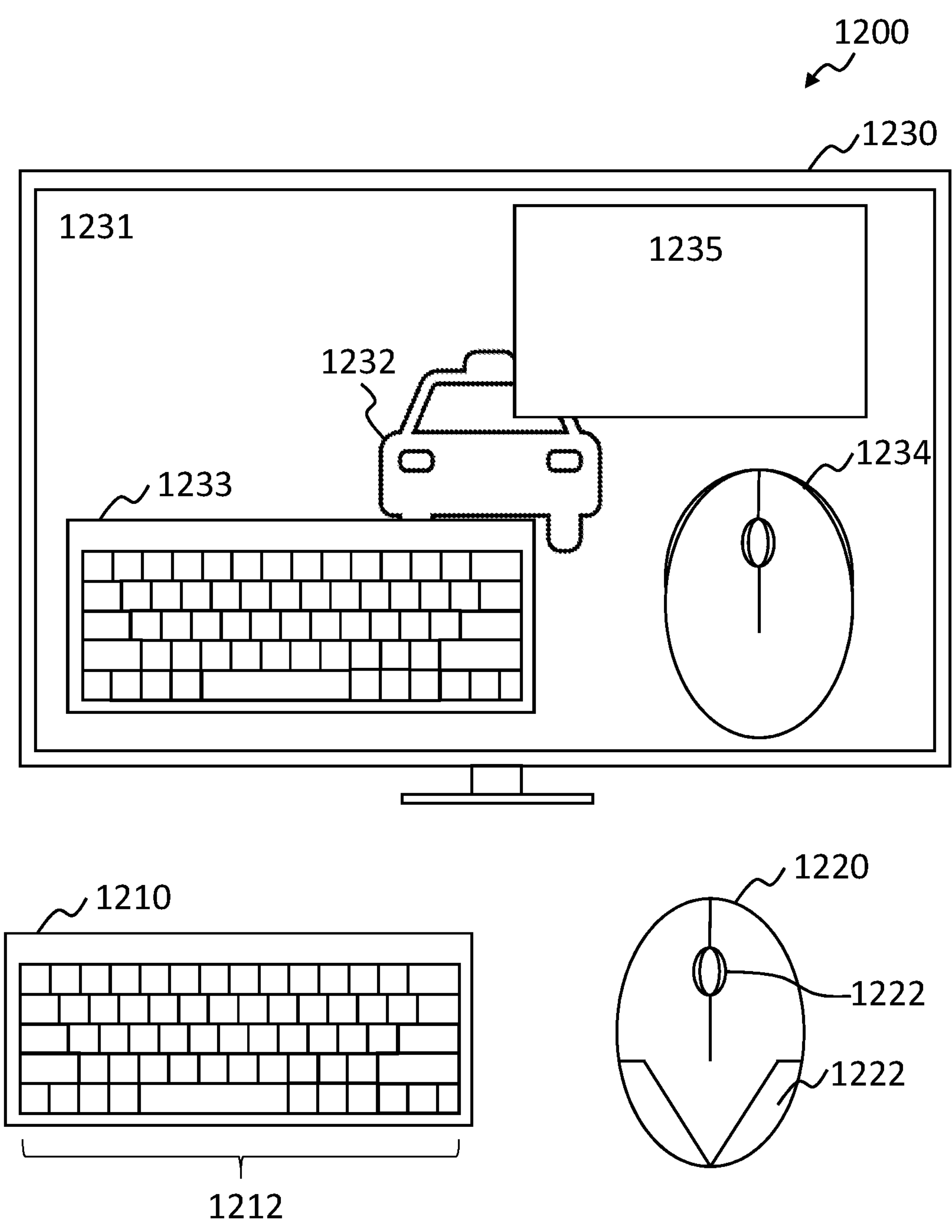

FIGS. 7 and 8 show exemplary diagrams of the system 1000 according to various embodiments. The system 1000 may comprise the first device 1100 and the second device 1200 (as described in further detail above with FIGS. 1 and 2). FIG. 7 shows an exemplary diagram of the first device 1100 and FIG. 8 shows an exemplary diagram of the second device 1200.

As shown in FIG. 7, in some embodiments, the first device 1100 may comprise the first display device 1130 including the first display 1131. In some embodiments, as shown in FIG. 7, the first display device 1130 may display video data 1132. For example, the first display device 1130 may display the video data 1132 relating to a game in which the first user is currently playing.

The first device 1100 may further comprise one or more first sub-devices. Hereinafter, for ease of explanation, the one or more first sub-devices will be referred to as a first keyboard 1110 and a first mouse 1120. In some embodiments, the first keyboard 1110 may comprise at least one light source 1112 of the first plurality of light sources of the first device 1100. For example, each light source of the at least one light source 1112 may be mounted under each key of the first keyboard 1110. In some embodiments, the first mouse 1120 may comprise at least one light source 1122 of the first plurality of light sources of the first device 1100. For example, each light source of the at least one light source 1122 may be mounted at side parts of the first mouse 1120 and be mounted adjacent to a scroll wheel of the first mouse 1120.

In some embodiments, each of the first keyboard 1110 and the first mouse 1120 may comprise the lighting engine (not shown) configured to control a lighting event for the first keyboard 1110 and the first mouse 1120 respectively. In some embodiments, each lighting engine may be configured to control each of the first keyboard 1110 and the first mouse 1120 to produce at least one predetermined lighting colour among the first plurality of lighting colours. Therefore, in some embodiments, while the first display device 1130 displays the video data 1132, each of the first keyboard 1110 and the first mouse 1120 may produce the at least one predetermined lighting colour among the first plurality of lighting colours over time.

As shown in FIG. 8, in some embodiments, the second device 1200 may comprise the second display device 1230 including the second display 1231. In some embodiments, as shown in FIG. 8, the second display device 1230 may display the video data 1232 received from the first device 1100 via the video synchronisation server (not shown).

In some embodiments, the second display device 1230 may display one or more image objects 1233, 1234 with at least one predetermined lighting colour among the second plurality of lighting colours based on the information about the lighting profile. In some embodiments, the image objects 1233, 1234 may relate to the one or more first sub-devices 1110, 1120 respectively. In some embodiments, the image objects 1233, 1234 may be displayed on top of the video data 1232. In some embodiments, the second device 1200 may be configured to control at least one of position, transparency and appearance (for example, skins) of the image objects 1233, 1234. In some embodiments, the second display device 1230 may display a status of the lighting event.

For example, as shown in FIG. 8, the second display device 1230 may display a keyboard image object 1233 corresponding to the first keyboard 1110 and a mouse image object 1234 corresponding to the first mouse 1120. The keyboard image object 1233 and the mouse image object 1234 may be displayed in colour(s) based on the information about the lighting profile. The keyboard image object 1233 and the mouse image object 1234 may reflect the lighting colour being produced by the first keyboard 1110 and the first mouse 1120 respectively. As an example, when the first keyboard 1110 and the first mouse 1120 of the first device 1100 are producing red colour, the keyboard image object 1233 and the mouse image object 1234 may be displayed in the red colour. When the first keyboard 1110 and the first mouse 1120 of the first device 1100 change their lighting colours from the red colour to green colour, the colours of the keyboard image object 1233 and the mouse image object 1234 may be also changed to the green colour. As an example, when the first keyboard 1110 and the first mouse 1120 of the first device 1100 are producing red colour, yellow colour and green colour together, the keyboard image object 1233 and the mouse image object 1234 may be displayed in the red colours, the yellow colour and the green colour. As shown in FIG. 8, the keyboard image object 1233 and the mouse image object 1234 may be displayed on top of the video data 1232. The second user may control at least one of position, transparency and appearance of the keyboard image object 1233 and/or the mouse image object 1234.

In some embodiments, the second display device 1230 may further display a panel 1235. The panel 1235 may notify when an event occurs, for example, when the second device 1200 is connected to the lighting synchronisation server (not shown) or when the second device 1200 receives the information about the lighting profile. In some embodiments, the panel 1235 may be used to control the at least one of position, transparency and appearance of the keyboard image object 1233 and/or the mouse image object 1234. In some embodiments, the second user may control at least one of position, transparency and appearance of the panel 1235.

The second device 1200 may further comprise one or more second sub-devices. Hereinafter, for ease of explanation, the one or more second sub-devices will be referred to as a second keyboard 1210 and a second mouse 1220. In some embodiments, the second keyboard 1210 may comprise at least one light source 1212 of the second plurality of light sources of the second device 1200. For example, each light source of the at least one light source 1212 may be mounted under each key of the second keyboard 1210. In some embodiments, the second mouse 1220 may comprise at least one light source 1222 of the second plurality of light sources of the second device 1200. For example, each light source of the at least one light source 1222 may be mounted at upper parts of the second mouse 1220 and be mounted adjacent to a scroll wheel of the second mouse 1220.

In some embodiments, each of the second keyboard 1210 and the second mouse 1220 may produce at least one predetermined lighting colour among the second plurality of lighting colours based on the information about the lighting profile received from the lighting synchronisation server. The second keyboard 1210 and the second mouse 1220 may reflect the lighting colour being produced by the first keyboard 1110 and the first mouse 1120 respectively. Therefore, in some embodiments, while the second display device 1230 displays the video data 1232, each of the second keyboard 1210 and the second mouse 1220 may produce the at least one predetermined lighting colour over time matched with the video data 1232. In some embodiments, while the first keyboard 1110 and the first mouse 1120 produce the at least one predetermined lighting colour, each of the second keyboard 1210 and the second mouse 1220 may produce the at least one predetermined lighting colour matched with the lighting colour produced by the first keyboard 1110 and the first mouse 1120.

In some embodiments, the information about the lighting profile may include information about the lighting profile compatible with different device types. The second device 1200 of a different device type from the first device 1100 may be capable of producing at least one predetermined lighting colour among the second plurality of lighting colours based on the information about the lighting profile. For example, as shown in FIG. 8, when the second mouse 1220 is different device type from the first mouse 1120, the second mouse 1220 may produce the at least one predetermined lighting colour based on the information about the lighting profile, as the information about the lighting profile received from the lighting synchronization server may include the information about the lighting profile compatible with different mouse types.

Figure 9:
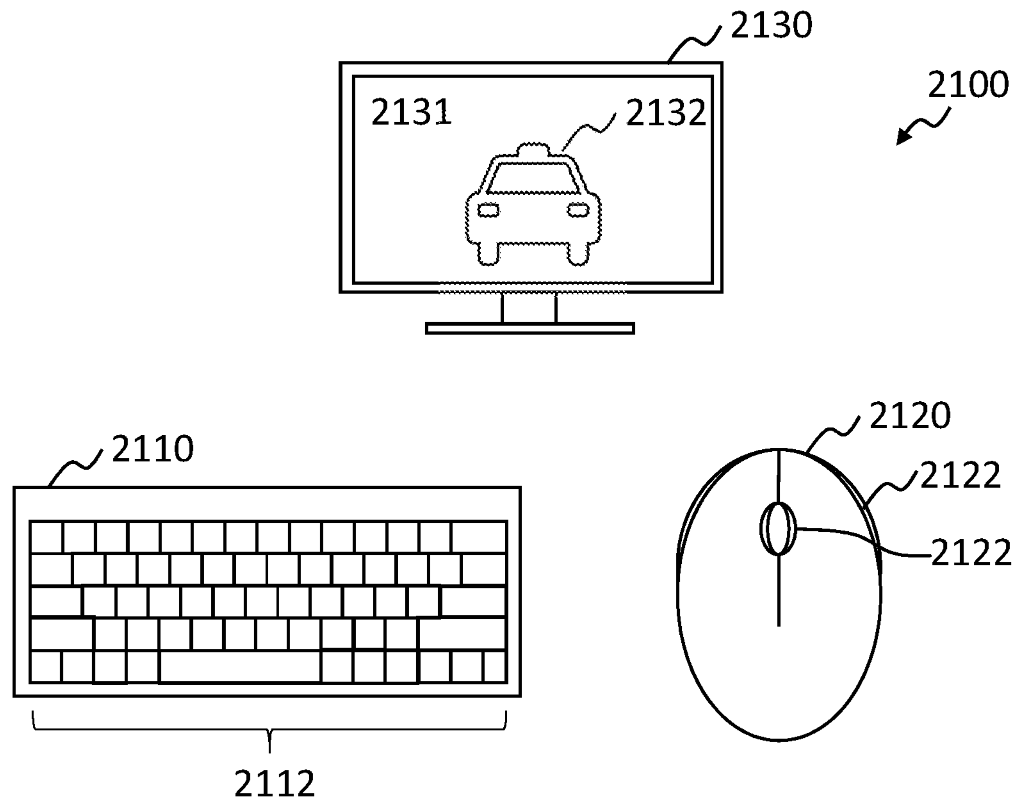
FIGS. 9 and 10 show exemplary diagrams of the another system according to various embodiments.
Figure 10:
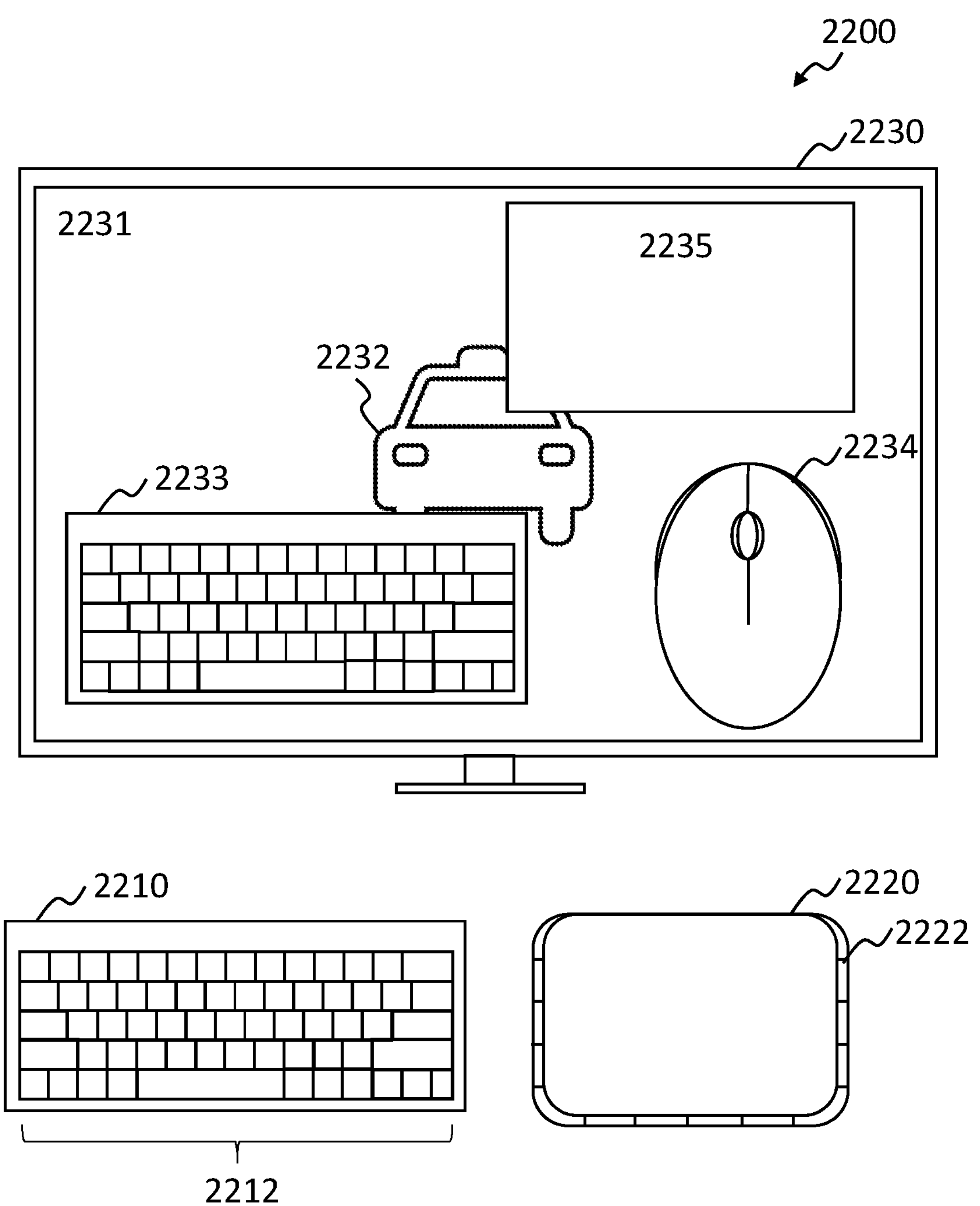

FIGS. 9 and 10 show exemplary diagrams of the system 2000 according to various embodiments. The system 2000 may comprise the first device 2100 and the second device 2200 (as described in further detail above with FIGS. 3 and 4). FIG. 9 shows an exemplary diagram of the first device 2100 and FIG. 10 shows an exemplary diagram of the second device 2200.

As shown in FIG. 9, in some embodiments, the first device 2100 may comprise the first display device 2130 including the first display 2131. In some embodiments, as shown in FIG. 9, the first display device 2130 may display video data 2132. For example, the first display device 2130 may display the video data 2132 relating to the game received from the cloud server (not shown).

The first device 2100 may further comprise one or more first sub-devices. Hereinafter, for ease of explanation, the one or more first sub-devices will be referred to as a first keyboard 2110 and a first mouse 2120. In some embodiments, the first keyboard 2110 may comprise at least one light source 2112 of the first plurality of light sources of the first device 2100. For example, each light source of the at least one light source 2112 may be mounted under each key of the first keyboard 2110. In some embodiments, the first mouse 2120 may comprise at least one light source 2122 of the first plurality of light sources of the first device 2100. For example, each light source of the at least one light source 2122 may be mounted at side parts of the first mouse 2120 and be mounted adjacent to a scroll wheel of the first mouse 2120. In some embodiments, each of the first keyboard 2110 and the first mouse 2120 may produce at least one predetermined lighting colour among the first plurality of lighting colours over time based on the information about the lighting profile received from the lighting synchronisation server (not shown). Therefore, in some embodiments, while the first display device 2130 displays the video data 2132, each of the first keyboard 2110 and the first mouse 2120 may produce the at least one predetermined lighting colour among the first plurality of lighting colours over time based on the information about the lighting profile. The first lighting colours selectively produced by each of the first keyboard 2110 and the first mouse 2120 may be matched with the video data.

As shown in FIG. 10, in some embodiments, the second device 2200 may comprise the second display device 2230 including the second display 2231. In some embodiments, as shown in FIG. 10, the second display device 2230 may display the video data 2232 received from the video synchronisation server (not shown).

In some embodiments, the second display device 2230 may display one or more image objects 2233, 2234 with at least one predetermined lighting colour among the second plurality of lighting colours based on the information about the lighting profile. In some embodiments, the image objects 2233, 2234 may relate to the one or more first sub-devices 2110, 2120 respectively. In some embodiments, the image objects 2233, 2234 may be displayed on top of the video data 2232. In some embodiments, the second device 2200 may be configured to control at least one of position, transparency and appearance (for example, skins) of the image objects 2233, 2234. In some embodiments, the second display device 2230 may display a status of the lighting event.

For example, as shown in FIG. 10, the second display device 2230 may display a keyboard image object 2233 corresponding to the first keyboard 2110 and a mouse image object 2234 corresponding to the first mouse 2120. The keyboard image object 2233 and the mouse image object 2234 may be displayed in colour(s) based on the information about the lighting profile. The keyboard image object 2233 and the mouse image object 2234 may reflect the lighting colour being produced by the first keyboard 2110 and the first mouse 2120 respectively. As an example, when the first keyboard 2110 and the first mouse 2120 of the first device 2100 are producing red colour, the keyboard image object 2233 and the mouse image object 2234 may be displayed in the red colour. When the first keyboard 2110 and the first mouse 2120 of the first device 2100 change their lighting colours from the red colour to green colour, the colours of the keyboard image object 2233 and the mouse image object 2234 may be also changed to the green colour. As an example, when the first keyboard 2110 and the first mouse 2120 of the first device 2100 are producing red colour, yellow colour and green colour together, the keyboard image object 2233 and the mouse image object 2234 may be displayed in the red colours, the yellow colour and the green colour. As shown in FIG. 10, the keyboard image object 2233 and the mouse image object 2234 may be displayed on top of the video data 2232. The second user may control at least one of position, transparency and appearance of the keyboard image object 2233 and/or the mouse image object 2234.

In some embodiments, the second display device 2230 may further display a panel 2235. The panel 2235 may notify when an event occurs, for example, when the second device 2200 is connected to the lighting synchronisation server or when the second device 2200 receives the information about the lighting profile. In some embodiments, the panel 2235 may be used to control the at least one of position, transparency and appearance of the keyboard image object 2233 and/or the mouse image object 2234. In some embodiments, the second user may control at least one of position, transparency and appearance of the panel 2235.

The second device 2200 may further comprise one or more second sub-devices. Hereinafter, for ease of explanation, the one or more second sub-devices will be referred to as a second keyboard 2210 and a second touchpad 2220. In some embodiments, the second keyboard 2210 may comprise at least one light source 2212 of the second plurality of light sources of the second device 2200. For example, each light source of the at least one light source 2212 may be mounted under each key of the second keyboard 2210. In some embodiments, the second touchpad 2220 may comprise at least one light source 2222 of the second plurality of light sources of the second device 2200. For example, each light source of the at least one light source 2222 may be mounted at edges of the second touchpad 2220.

In some embodiments, each of the second keyboard 2210 and the second touchpad 2220 may produce at least one predetermined lighting colour among the second plurality of lighting colours based on the information about the lighting profile received from the lighting synchronisation server. The second keyboard 2210 may reflect the lighting colour being produced by the first keyboard 2110. The second touchpad 2220 may produce the lighting colour based on the information of the lighting profile, and the produced lighting colour may be matched with the video data 2232 and/or the lighting colour produced by other devices, for example, the first keyboard 2110, the first mouse 2120 and/or the second keyboard 2210. Therefore, in some embodiments, while the second display device 2230 displays the video data 2232, each of the second keyboard 2210 and the second touchpad 2220 may produce the at least one predetermined lighting colour matched with the video data 2232. In some embodiments, while the first keyboard 2110 and the first mouse 2120 produce the at least one predetermined lighting colour, each of the second keyboard 2210 and the second touchpad 2220 may produce the at least one predetermined lighting colour matched with the lighting colour produced by the first keyboard 2110 and the first mouse 2120.

As described above with FIGS. 1 to 10, in the system and the method according to various embodiments of the present disclosure, lighting experiences may be shared across the first user and the second user. According to various embodiments, the second user may have the same lighting event which matches with the video data that the second user is watching on a live stream. According to various embodiments, the second user may be aware of second sub-device (s) that supports the lighting event. According to various embodiments, the second user without second sub-device(s) may be able to see the lighting event for recommended compatible sub-device(s) via the second display device 1130, 2130.

Although not shown in FIGS. 9 and 10, in some embodiments, the game instances may run on the cloud server. The information about the lighting profile in relation to the video data, for example, the game, may be generated by the cloud server and be sent to the second device 2200 through the lighting synchronisation server. The information about the lighting profile in relation to the video data, for example, the game, may also be sent to the first device 2100 through the lighting synchronisation server.

Although not shown in FIGS. 9 and 10, in some embodiments, the first device 2100 may further comprise the supplementary lighting engine (also referred to as a "moderator") configured to supplement the lighting event. The supplementary lighting engine may be configured to transmit information about another lighting profile which is created by the first device 2100 (for example, manually by the first user) or detected from the first device 2100 (for example, captured from application(s) and/or game(s)) to the second device 2200 through the lighting synchronisation server.

In some embodiments, the moderator(s) may be assigned as one or more of at least one of a user, a software application, or a stream bot. In some embodiments, the moderator(s) may be assigned as a viewer (also referred to as the "second user"). The viewer may control the streamer's (also referred to as the "first user") lighting profile via a streaming chat message and/or a command. The viewer may control the streamer's lighting profile via an additional extension overlay, a panel (for example, the panel 2235), and/or a remote connected service. In some embodiments, a plurality of lighting profiles may be associated with the same social channel. This may serve a use case where multiple users may be part of the same lighting profile, and the viewer may tune into the lighting profile from their desired player. This may also provide a customization and a choice for the viewer to be able to select from the plurality of lighting profiles available on the same channel. The viewer may subscribe to the lighting profile from the streamer, a guest, or the moderator to obtain their desired lighting profile. The viewer may create a lighting profile and broadcast the created lighting profile to the social channel that he/she is watching.

Although not shown, in some embodiments, the information about the lighting profile may be broadcasted from a console, for example, an Xbox. Games using an Xbox Dynamic Lighting (XDL) may translate their lighting events into the information about the lighting profile to broadcast to the viewer. The viewer may have his/her device(s) (also referred to as the "second device 2200") showing the lighting events synchronised with the game running on the streamer's console. The information about the lighting profile for one of the second sub-devices which is not connected to the console may also be sent from the console. Even though the streamer might lack a first sub-device to display a certain lighting event, the viewer's second sub-device may be able to display the certain lighting event. For example, the Xbox may support second sub-devices for a mouse and a keyboard, yet it may still broadcast the information about the lighting profile for other second sub-devices, for example, a ChromaLink, a headset, a keypad, and a mousepad.

Although not shown, in some embodiments, the supplementary lighting engine may supplement the information about the lighting profile that originates from the streamer to emphasize events happening during the live stream. The lighting event may be triggered after an event, for example, a follower, a subscription, a gift, an announcement, a donation, and/or a giveaways event, occurs to enhance a user engagement. The lighting event may be used to emphasize a specific moment during a gameplay.

Although not shown, in some embodiments, the video synchronisation server may recommend game(s) or other contents supporting the lighting event. Therefore, according to various embodiments, the first user and/or the second user may be attracted to channels which feature the lighting event.

Although not shown, in some embodiments, the video synchronisation server may facilitate the first user connecting his/her video data with the lighting event. In some embodiments, the video synchronisation server may allow the first user to create a lighting profile and share the created lighting profile with the second user. In some embodiments, the first user may select a lighting profile to be shared via a user interface provided by the video synchronisation server. In some embodiments, the second user may select a lighting profile to be received via the user interface provided by the video synchronisation server. For example, if the second user does not select any lighting profile, the second user may automatically subscribe to a lighting profile shared by the first user. The second user may deactivate the subscription.

The following examples pertain to further embodiments.

Example 1 is a system for synchronising a lighting event among devices, the system comprising: a first device comprising a first display configured to display video data, a first plurality of light sources capable of selectively producing a first plurality of lighting colours, and a lighting engine configured to detect a lighting profile for the produced first plurality of lighting colours and generate information about the lighting profile: a video synchronisation server configured to transmit the video data being displayed on the first display of the first device to a second device, and comprising a user interface configured to be accessed by the first device; the second device comprising a second display configured to display the video data received from the video synchronisation server, and a second plurality of light sources capable of selectively producing a second plurality of lighting colours; and a lighting synchronisation server configured to receive the information about the lighting profile from the lighting engine of the first device, wherein, when the first device allows to broadcast the information about the lighting profile via the user interface, the video synchronisation server is further configured to control the lighting synchronisation server to transmit the information about the lighting profile with a timestamp to the second device, so that the second device is capable of selectively producing the second plurality of lighting colours based on the information about the lighting profile and the produced second plurality of lighting colours are matched with the video data being received from the video synchronisation server.

In example 2, the subject-matter of example 1 may further include: the first device comprises one or more first sub-devices, and each of the one or more first sub-devices comprises at least one light source of the first plurality of light sources.

In example 3, the subject-matter of example 2 may further include: each of the first plurality of light sources includes an RGB LED (red-green-blue light emitting diode).

In example 4, the subject-matter of example 2 or example 3 may further include: the second display of the second device is further configured to display one or more image objects with at least one predetermined lighting colour among the second plurality of lighting colours based on the information about the lighting profile.

In example 5, the subject-matter of example 4 may further include: the image objects relate to the one or more first sub-devices respectively.

In example 6, the subject-matter of example 4 or claim 5 may further include: the image objects are displayed on top of the video data.

In example 7, the subject-matter of any one of examples 4 to 6 may further include: the second device is configured to control at least one of position, transparency and appearance of the image objects.

In example 8, the subject-matter of any one of examples 1 to 7 may further include: the second device comprises one or more second sub-devices, and each of the one or more second sub-devices comprises at least one light source of the second plurality of light sources, and the light sources of each of the one or more second sub-devices are configured to produce at least one predetermined lighting colour among the second plurality of lighting colours based on the information about the lighting profile.

In example 9, the subject-matter of example 8 may further include: each of the second plurality of light sources includes an RGB LED (red-green-blue light emitting diode).

In example 10, the subject-matter of any one of examples 1 to 9 may further include: the first device is configured to selectively enable or disable the broadcasting of the information about the lighting profile via the user interface.

In example 11, the subject-matter of example 10 may further include: when the broadcasting of the information about the lighting profile is disabled by the first device, the video synchronisation server is configured to control the lighting synchronisation server to stop transmitting the information about the lighting profile.

In example 12, the subject-matter of any one of examples 1 to 11 may further include: the information about the lighting profile includes information about the lighting profile compatible with different device types, and the second device of a different device type from the first device is capable of producing at least one predetermined lighting colour among the second plurality of lighting colours based on the information about the lighting profile.

In example 13, the subject-matter of any one of examples 2 to 7 may further include: the lighting engine is configured to control the light sources of each of the one or more first sub-devices to produce at least one predetermined lighting colour among the first plurality of lighting colours.

In example 14, the subject-matter of example 13 may further include: the first device further comprises an input device configured to trigger switching between a plurality of lighting profiles, and the lighting engine is configured to control the light sources of each of the one or more first sub-devices to produce at least one predetermined lighting colour respectively based on one of the plurality of lighting profiles selected by switching.

Example 15 is a system for synchronising a lighting event among devices, the system comprising: a first device comprising a first display configured to display video data, and a first plurality of light sources capable of selectively producing a first plurality of lighting colours: a video synchronisation server configured to transmit the video data being displayed on the first display of the first device to a second device; the second device comprising a second display configured to display the video data received from the video synchronisation server, and a second plurality of light sources capable of selectively producing a second plurality of lighting colours: a cloud server configured to provide the video data to the first device, and generate information about a lighting profile for the video data; and a lighting synchronisation server configured to receive the information about the lighting profile from the cloud server, wherein the video synchronisation server is further configured to control the lighting synchronisation server to transmit the information about the lighting profile with a timestamp to the first device and the second device, so that the first device is capable of selectively producing the first plurality of lighting colours and the second device is capable of selectively producing the second plurality of lighting colours based on the information about the lighting profile, and the first lighting colours selectively produced by the first device and the second lighting colours selectively produced by the second device are matched with the video data.

In example 16, the subject-matter of example 15 may further include: the first device comprises one or more first sub-devices, and each of the one or more first sub-devices comprises at least one light source of the first plurality of light sources.

In example 17, the subject-matter of example 16 may further include: each of the first plurality of light sources includes an RGB LED (red-green-blue light emitting diode).

In example 18, the subject-matter of example 16 or example 17 may further include: the second display of the second device is further configured to display one or more image objects with at least one predetermined lighting colour among the second plurality of lighting colours based on the information about the lighting profile.

In example 19, the subject-matter of example 18 may further include: the image objects relate to the one or more first sub-devices respectively.

In example 20, the subject-matter of example 18 or example 19 may further include: the image objects are displayed on top of the video data.

In example 21, the subject-matter of any one of examples 18 to 20 may further include: the second device is configured to control at least one of position, transparency and appearance of the image objects.

In example 22, the subject-matter of any one of examples 15 to 21 may further include: the second device comprises one or more second sub-devices, and each of the one or more second sub-devices comprises at least one light source of the second plurality of light sources respectively, and the light sources of each of the one or more second sub-devices are configured to produce at least one predetermined lighting colour among the second plurality of lighting colours based on the information about the lighting profile.

In example 23, the subject-matter of example 22 may further include: each of the second plurality of light sources includes an RGB LED (red-green-blue light emitting diode).

In example 24, the subject-matter of any one of examples 16 to 21 may further include: the first device comprises a lighting engine configured to control the light sources of each of the one or more first sub-devices to produce at least one predetermined lighting colour among the first plurality of lighting colours based on the information about the lighting profile.

In example 25, the subject-matter of any one of examples 15 to 24 may further include: the first device further comprises a supplementary lighting engine configured to transmit information about another lighting profile created by the first device or detected from the first device to the second device via the lighting synchronisation server.

Example 26 is a method of synchronising a lighting event among devices, the method comprising: detecting a lighting profile for a first plurality of lighting colours selectively being produced in a first device; generating information about the lighting profile: transmitting the information about the lighting profile from the first device to a lighting synchronisation server; transmitting video data being displayed on the first device to a second device via a video synchronisation server; accessing, by the first device, a user interface provided by the video synchronisation server to allow to broadcast the information about the lighting profile; and controlling the lighting synchronisation server to transmit the information about the lighting profile with a timestamp to the second device, so that the second device is capable of selectively producing a second plurality of lighting colours based on the information about the lighting profile and the produced second plurality of lighting colours are matched with the video data being received from the video synchronisation server.

Example 27 is a method of synchronising a lighting event among devices comprising: providing video data to a first device by a cloud server, so that the first device displays the video data; transmitting the video data being displayed on the first device to a second device via a video synchronisation server; generating information about a lighting profile for the video data by the cloud server; transmitting the information about the lighting profile from the cloud server to a lighting synchronisation server; and controlling the lighting synchronisation server to transmit the information about the lighting profile with a timestamp to the first device and the second device, so that the first device is capable of selectively producing a first plurality of lighting colours and the second device is capable of selectively producing a second plurality of lighting colours based on the information about the lighting profile, and the first plurality of lighting colours selectively produced by the first device and the second plurality of lighting colours selectively produced by the second device are matched with the video data.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A system for synchronising a lighting event among devices, the system comprising:

a first device comprising a first display configured to display video data, and one or more first peripheral devices, each of the one or more first peripheral devices comprising at least one first light source configured to produce at least one lighting colour, wherein the one or more first peripheral devices are different from the first display;

a video synchronisation server configured to transmit the video data being displayed on the first display of the first device to a second device;

the second device comprising a second display configured to display the video data received from the video synchronisation server; and a lighting synchronisation server configured to receive information about a lighting profile for the at least one lighting colour being produced by the one or more first peripheral devices, wherein the video synchronisation server is further configured to control the lighting synchronisation server to transmit the information about the lighting profile with a timestamp to the second device, wherein the second device further comprises one or more second peripheral devices, each of the one or more second peripheral devices comprising at least one second light source configured to produce the at least one lighting colour produced by at least one of the one or more first peripheral devices based on the information about the lighting profile received from the lighting synchronisation server, wherein the one or more second peripheral devices are different from the second display.

2. The system according to claim 1, wherein the one or more second peripheral devices comprises one second peripheral device configured to produce the at least one lighting colour produced by one first peripheral device of the one or more first peripheral device and another second peripheral device configured to produce the at least one colour produced by another first peripheral device of the one or more first peripheral devices based on the information about the lighting profile.

3. The system according to claim 1, wherein the second display of the second device is further configured to display one or more image objects with the at least one lighting colour produced by the one or more first peripheral devices based on the information about the lighting profile.

4. The system according to claim 3, wherein the image objects relate to the one or more first peripheral devices respectively.

5. The system according to claim 3, wherein the image objects are displayed on top of the video data.

6. The system according to claim 3, wherein the second device is configured to control at least one of position, transparency and appearance of the image objects.

7. The system according to claim 1, wherein wherein each of the at least one second light source includes an RGB LED (red-green-blue light emitting diode).

8. The system according to claim 1, wherein the first device is configured to selectively enable or disable broadcasting of the information about the lighting profile via a user interface.

9. The system according to claim 8, wherein when the broadcasting of the information about the lighting profile is disabled by the first device, the video synchronisation server is configured to control the lighting synchronisation server to stop transmitting the information about the lighting profile.

10. The system according to claim 1, wherein the information about the lighting profile includes information about the lighting profile compatible with different device types, and the one or more second peripheral devices of a different device type from the one or more first peripheral devices are capable of producing the at least one lighting colour produced by the at least one of the one or more first peripheral devices based on the information about the lighting profile.

11. The system according to claim 1, further comprising a lighting engine is configured to (i) control the at least one first light sources of each of the one or more first peripheral devices to produce the at least one lighting colour, respectively or (ii) detect the lighting profile for the at least one lighting colour produced by the one or more first peripheral devices and generate the information about the lighting profile.

12. The system according to claim 11, wherein the first device further comprises an input device configured to trigger switching between a plurality of lighting profiles, and the lighting engine is configured to control the at least one first light source of each of the one or more first peripheral devices to produce the at least one lighting colour respectively based on one of the plurality of lighting profiles selected by switching.

13. The system according to claim 1, further comprising:

a cloud server configured to provide the video data to the first device, and generate the information about the lighting profile for the at least one lighting colour produced by the one or more first peripheral devices, wherein the video synchronisation server is further configured to control the lighting synchronisation server to transmit the information about the lighting profile with the timestamp to the first device, and the at least one first light source of each of the one or more first peripheral devices of the first device is configured to produce the at least one lighting colours respectively based on the information about the lighting profile received from the lighting synchronisation server.

14. The system according to claim 1, wherein the first device comprises a lighting engine configured to control the at least one first light source of each of the one or more first peripheral devices to produce the at least one lighting colour based on the information about the lighting profile, respectively.

15. The system according to claim 1, wherein the first device further comprises a supplementary lighting engine configured to transmit information about another lighting profile created by the first device or detected from the first device to the second device via the lighting synchronisation server.

16. The system according to claim 1, wherein each of the at least one first light source includes an RGB LED (red-green-blue light emitting diode).

17. The system according to claim 1, wherein the video synchronisation server comprises a user interface configured to be accessed by the first device, wherein when the first device allows to broadcast the information about the lighting profile via the user interface, the video synchronisation server controls the lighting synchronisation server to transmit the information about the lighting profile with the timestamp to the second device.

18. The system according to claim 1, wherein the at least one lighting colour produced by the one or more first peripheral devices matches with the video data.

19. A method of synchronising a lighting event among devices, the method comprising:

displaying video data by a first display of a first device;

producing, by at least one first light source of each of one or more first peripheral devices of the first device, at least one lighting colour;

receiving information about a lighting profile for the at least one lighting colour being produced by the one or more first peripheral devices by a lighting synchronisation server, wherein the one or more first peripheral devices are different from the first display;

transmitting the video data being displayed on the first display of the first device to a second device via a video synchronisation server;

displaying the video data received from the video synchronisation server by a second display of the second device;

controlling, by the video synchronisation server, the lighting synchronisation server to transmit the information about the lighting profile with a timestamp to the second device; and producing, by at least one second light source of each of one or more second peripheral devices of the second device, the at least one lighting colours produced by at least one of the one or more first peripheral devices based on the information about the lighting profile received from the video lighting synchronisation server, wherein the one or more second peripheral devices are different from the second display.

20. The method according to claim 19, the method further comprising:

providing the video data to the first device by a cloud server, so that the first device displays the video data;

generating the information about the lighting profile for the at least one lighting colour; and controlling, by the video synchronisation server, the lighting synchronisation server to transmit the information about the lighting profile with the timestamp to the first device, so that the at least one first light source of the one or more first peripheral devices of the first device produces the at least one lighting colour based on the information about the lighting profile.

* * * * *